United States Patent
Eidelson et al.

(10) Patent No.: US 9,785,979 B2
(45) Date of Patent: *Oct. 10, 2017

(54) CUSTOMIZED LANDING PAGES

(71) Applicant: Google Inc., Mountain View, CA (US)

(72) Inventors: Benjamin David Eidelson, Palo Alto, CA (US); Jason Prado, San Francisco, CA (US); Sean Liu, El Dorado Hills, CA (US); Doug Sherrets, San Francisco, CA (US); Raj Krishnan, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/380,126

(22) Filed: Dec. 15, 2016

(65) Prior Publication Data

US 2017/0098249 A1    Apr. 6, 2017

Related U.S. Application Data

(63) Continuation of application No. 14/216,372, filed on Mar. 17, 2014, now Pat. No. 9,542,697.

(60) Provisional application No. 61/793,509, filed on Mar. 15, 2013.

(51) Int. Cl.
*G06Q 30/02* (2012.01)
*G06F 17/30* (2006.01)

(52) U.S. Cl.
CPC ... *G06Q 30/0271* (2013.01); *G06F 17/30867* (2013.01); *G06Q 30/0256* (2013.01)

(58) Field of Classification Search
CPC ............ G06C 30/0271; G06C 30/0256; G06F 17/30867
USPC ...................................................... 705/14.54
See application file for complete search history.

(56) References Cited

U.S. PATENT DOCUMENTS

| | | | |
|---|---|---|---|
| 7,818,399 B1 | 10/2010 | Ross, Jr. et al. | |
| 8,005,715 B2 | 8/2011 | Smith et al. | |
| 8,150,979 B1 | 4/2012 | Oldham | |
| 2003/0088554 A1 | 5/2003 | Ryan et al. | |
| 2011/0022461 A1 | 1/2011 | Simeonov | |
| 2011/0213655 A1 | 9/2011 | Henkin et al. | |
| 2011/0231240 A1 | 9/2011 | Schoen et al. | |
| 2012/0016741 A1 | 1/2012 | Brunsman et al. | |
| 2012/0185262 A1 | 7/2012 | Dalesandro et al. | |
| 2013/0197994 A1 | 8/2013 | Karlsson et al. | |

*Primary Examiner* — Namrata Boveja
*Assistant Examiner* — Michael Ezewoko
(74) *Attorney, Agent, or Firm* — Fish & Richardson P.C.

(57) ABSTRACT

Methods, systems, and apparatus, including computer programs encoded on a computer storage medium, for personalizing landing pages. In one aspect, a method includes generating, by one or more servers belonging to a first domain and for a request, a personalized landing page that includes the personalized landing page data, wherein the landing page belongs to the first domain, and the landing page includes at least one link to a resource of the first party that belongs to the second domain; and providing, by the one or more servers, the personalized landing page to the user device, wherein the personalized landing page, when processed by the user device, generates a personalized landing page environment that belongs to the first domain.

18 Claims, 5 Drawing Sheets

CUSTOMIZED LANDING PAGES

CLAIM OF PRIORITY

This application is a continuation of U.S. patent application Ser. No. 14/216,372, entitled "Customized Landing Pages," filed on Mar. 17, 2014, which claims the benefit under 35 U.S.C. §119(e) of U.S. Provisional Patent Application No. 61/793,509, entitled "Customized Landing Pages," filed Mar. 15, 2013, both applications of which are incorporated herein by reference in their entirety.

BACKGROUND

This specification relates to customization of landing pages.

The Internet enables access to a wide variety of content, e.g., video and/or audio files, web pages for particular subjects, news articles, etc. Such access likewise enables opportunities for serving additional content items with the content. For example, advertisements can be provided with search results in response to a search query provided by a user, or provided for web pages of third party online publishers that have content related to the advertisement. These content items often include a link to a landing page. The landing page is provided to the user device when a user of the user device selects the content item.

Some content item providers also provide webpages that are tailored for a particular user based on information the content item provider has about the user. For example, an on-line retailer may provide users the opportunity to maintain accounts with the retailer. Each user account may include personal information provided by the user, and may also include purchasing, search and browsing history specific to the content item provider's website for the user. Using this information, the content item provider can determine offerings that may be of particular interest to the user. For example, an on-line clothing retailer may provide a search capability for clothing offers. Search results for each search for a same query from two different users may differ, as the search results are selected, in part, based on the user information available for each user.

SUMMARY

In general, one innovative aspect of the subject matter described in this specification can be embodied in methods that include the actions of receiving, from a user device, a request for a landing page in response to a selection of a content item displayed in a resource at the user device, the resource belonging to the first domain, and the content item sponsored by a first party associated with a second domain that is different from the first domain; accessing personalization data for the request; determining, based at least in part on the personalization data, personalized landing page data for the request; generating for the request, a personalized landing page that includes the personalized landing page data, wherein: the landing page belongs to the first domain, and the landing page includes at least one link to a resource of the first party that belongs to the second domain; providing the personalized landing page to the user device, wherein the personalized landing page, when processed by the user device, generates a personalized landing page environment that belongs to the first domain. Other embodiments of this aspect include corresponding systems, apparatus, and computer programs, configured to perform the actions of the methods, encoded on computer storage devices. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the actions.

In general, another innovative aspect of the subject matter described in this specification can be embodied in methods that include the actions of receiving, from a user device, a request for a landing page in response to a selection of a link to a search result displayed on a search results page at the user device, the search results page belonging to the first domain and the search result describing content sponsored by a first party associated with a second domain that is different from the first domain; determining, based at least in part on the personalization data, personalized search parameters for the request; generating for the request, a personalized landing page for the search result, the content of the personalized landing page being further filtered based on the personalized search parameters, wherein: the personalized landing page belongs to the first domain, and the personalized landing page at least one link to a resource of the first party that belongs to the second domain; providing the personalized landing page to the user device, wherein the personalized landing page, when processed by the user device, generates a personalized landing page environment that belongs to the first domain. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The systems and methods enable the generation of customize landing pages for advertisers without exposing personalization information, e.g., search history, to the advertisers. This results in landing pages that are more likely to satisfy users' information needs, and in turn increases advertisements yield. The landing page can be provided and hosted by a content item serving system, e.g., an advertising management system, and can provide links to pages hosted by the advertiser. The landing page can be a template provided by the advertiser so that branding, look and feel from the landing page to the subsequent page hosted by the advertiser are consistent.

In some implementations, the personalized landing page is for a search result, and is a collection of data from a particular site that may provide information that may satisfy the user's information need. For example, the search history of the user may indicate the user is searching for a particular type of information (e.g., information for reviews of a particular menu item, a particular product, etc.). A latter search query may surface the particular site, but the latter search query may not be a complete formation of the user's informational need. Accordingly, the system can, based on earlier search queries, provide a landing page that includes information from the particular site that is relevant to both the latter query and earlier queries. However, the user's privacy is protected, as the search engine does not provide the search queries to the particular site to collect the information.

The information on a personalized page, as presented in the context of previous queries and a current query, helps users understand why the search system presents the personalized data, and thus users may better appreciate the information present to them.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

Figure 1:
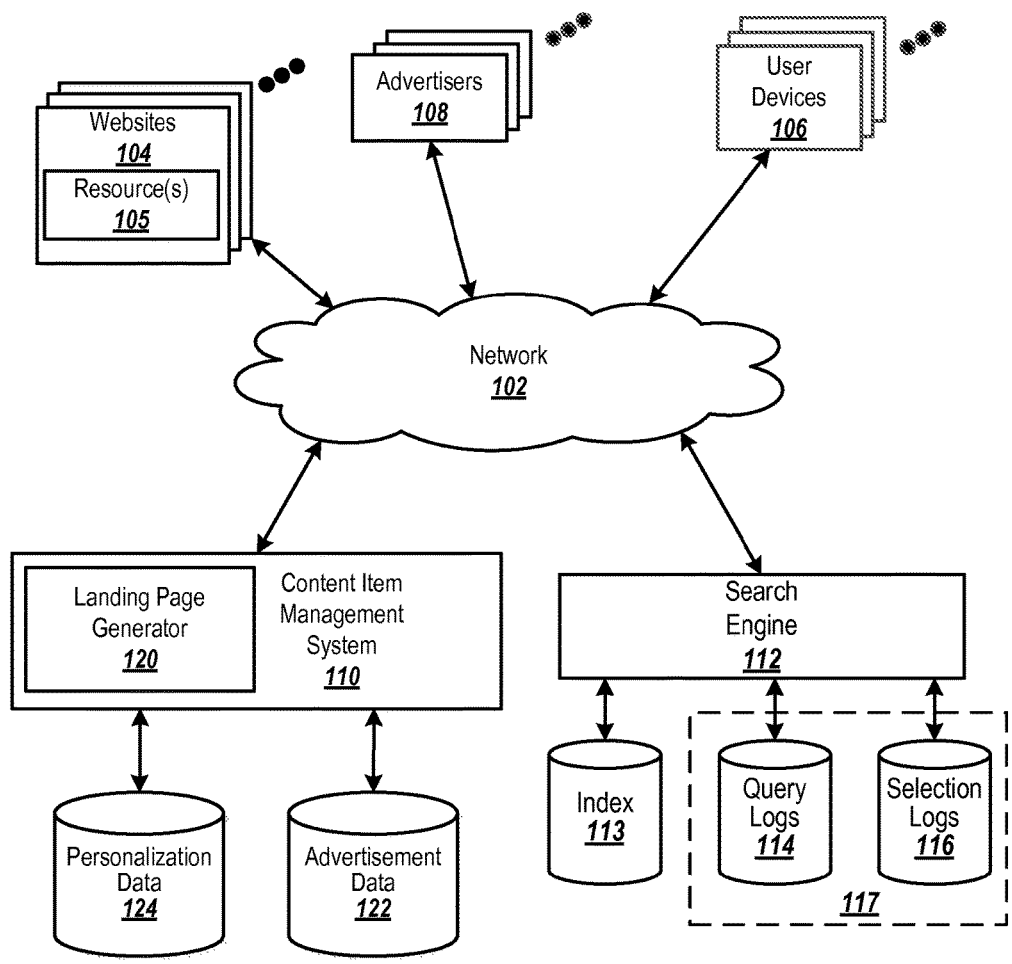
FIG. 1 is a block diagram of an example environment in which customized landing pages are provided to users based on unexposed personalization data.

This specification describes technologies relating to customization of landing pages based on unexposed personalization data. Specifically, this specification describes systems and methods to provide a content item landing page hosted by a content item server having a first domain. One example content item is a landing page, and an example content item service is an advertising management system.

The advertising management system enables customized landing page information without exposing personalization information to the advertiser. The personalization information is extant information the advertising management system, or a system in data communication with the advertising management system, such as a search engine, has regarding user interactions. For example, past search history associated with a user device may be used as personalization information.

The first domain is a domain of an advertising service, and a second domain is a domain of an advertiser. The content item server, e.g., an ad server, belonging to the first domain receives requests for landing pages from user devices. The content item server accesses personalization data associated with the request and generates a customized landing page belonging to the first domain, based on the accessed data. The advertiser can provide offerings and next links to the content item server, and the content item server can use personalization data to customize the offerings and links that are presented in the customized landing page.

The offering and link data can be provided by the advertisers in the form of feeds or annotated crawl pages. The personalization data can be search data and, if a user allows access, web history data of the user. The advertising server accesses the offering data and personalization data to generate a customized landing page that is displayed in an environment that belongs to a first domain of the advertising server and not the advertiser. The environment can be the landing page itself hosted within the first domain of the advertising server, or can be an iFrame that belongs to the first domain and that is a child of a parent frame that belongs to a second domain that is the domain of the advertiser. In either case, personalization data is not exposed to the advertiser—the second domain is different from the first domain, and thus the personalization data of the content server is not exposed to the advertiser. Selection of an offering in the landing page then directs the user device to a page that belongs to the second domain of the advertiser.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. For example, the advertising management system may request permission from a user to generate the customized landing page information using the personalization information of the user. Should the user decline to provide permission, then selection of an advertisement will result in a request for the page that belongs to the advertiser instead of the customized landing page. The request for permission may occur prior to generating the customized landing page and by means of a conspicuous dialog, such as "May we use personalization information for you to generate a customized landing page?" coupled with "Yes" and "No" options. Alternatively, the request may occur after generating the customized landing page, such as "The landing page that you see was customized for you by use of personalization information. If you don't want us to use personalization information to generate customized landing pages, select 'No,' otherwise, if you do want us to use personalization information to generate customized landing pages, select 'Yes.'"

In addition, certain data may be treated in one or more ways before it is stored or used, so that certain information about the user is removed. For example, a user's identity may be treated so that identifying information can be determined for the user, or a user's geographic location may be generalized where location information is obtained (such as to a city, ZIP code, or state level), so that a particular location of a user cannot be determined. Additionally, a user may be able to specify whether a landing page will be personalized. Thus, the user may have control over how information is collected about the user and used by a content server.

Example Operating Environment

FIG. 1 is a block diagram of an example environment 100 in which customized landing pages are generated based on unexposed personalization data. A computer network 102, such as a local area network (LAN), wide area network (WAN), the Internet, or a combination thereof, connects publisher web sites 104, user devices 106, and the search engine 112, and a content item management system 110. The online environment 100 may include many thousands of publisher web sites 104 and user devices 106.

A publisher website 104 includes one or more resources 105 associated with a domain and hosted by one or more servers in one or more locations. Generally, a website is a collection of web pages formatted in hypertext markup language (HTML) that can contain text, images, multimedia content, and programming elements, for example, scripts. Each web site 104 is maintained by a content publisher, which is an entity that controls, manages and/or owns the website 104.

A resource is any data that can be provided by a publisher website 104 over the network 102 and that has a resource address, e.g., a uniform resource locator (URL). Resources may be HTML pages, electronic documents, images files, video files, audio files, and feed sources, to name just a few. The resources may include embedded information, e.g., meta information and hyperlinks, and/or embedded instructions, e.g., client-side scripts.

A user device 106 is an electronic device that is under the control of a user and is capable of requesting and receiving resources over the network 102. Example user devices 106 include personal computers, mobile communication devices, and other devices that can send and receive data over the network 102. A user device 106 typically includes a user application, e.g., a web browser, to facilitate the sending and receiving of data over the network 102. The web browser can enable a user to display and interact with text, images, videos, music and other information typically located on a web page at a website on the world wide web or a local area network.

To facilitate searching of these resources 105, the search engine 112 identifies the resources by crawling the publisher web sites 104 and indexing the resources provided by the publisher web sites 104. The resources are indexed and the index data are stored in an index 113.

The user devices 106 submit search queries to the search engine 112. The search queries are submitted in the form of a search request that includes the search request and, optionally, a unique identifier that identifies the user device 106 that submits the request. The unique identifier can be data from a cookie stored at the user device, or a user account identifier if the user maintains an account with the search engine 112, or some other identifier that identifies the user device 106 or the user using the user device.

In response to the search request, the search engine 112 uses the index 113 to identify resources that are relevant to the queries. The search engine 112 identifies the resources in the form of search results and returns the search results to the user devices 106 in search results page resource. A search result is data generated by the search engine 112 that identifies a resource or provides information that satisfies a particular search query. A search result for a resource can include a web page title, a snippet of text extracted from the web page, and a resource locator for the resource, e.g., the URL of a web page.

The user devices 106 receive the search results pages and render the pages for presentation to users. In response to the user selecting a search result at a user device 106, the user device 106 requests the resource identified by the resource locator included in the selected search result. The publisher of the web site 104 hosting the resource receives the request for the resource from the user device 106 and provides the resource to the requesting user device 106.

In some implementations, the queries submitted from user devices 106 are stored in query logs 114. Selection data for the queries and the web pages referenced by the search results and selected by users are stored in selection logs 116. The query logs 114 and the selection logs 116 define search history data 117 that include data from and related to previous search requests associated with unique identifiers. The selection logs represent actions taken responsive to search results provided by the search engine 112. The query logs 114 and selection logs 116 can be used to map queries submitted by user devices to resources that were identified in search results and the actions taken by users when presented with the search results in response to the queries. In some implementations, data are associated with the identifiers from the search requests so that a search history for each identifier can be accessed. The selection logs 116 and query logs 114 can thus be used by the search engine to determine the respective sequences of queries submitted by the user devices, the actions taken in response to the queries, and how often the queries have been submitted.

The content management system 120 provides content items for presentation with the resources 105. A variety of appropriate content items can be provided—one example content item is an advertisement. In the case of advertisements, the content item management system 120 allows advertisers to define selection rules that take into account attributes of the particular user to provide relevant advertisements for the users. Example selection rules include keyword selection, in which advertisers provide bids for keywords that are present in either search queries or resource content or metadata. Advertisements that are associated with keywords having bids that result in an advertisement slot being awarded in response to an auction are selected for displaying in the advertisement slots. The relevant advertisements can be provided for presentation on the resources 105 of the publishers 104, or on a search results page resource.

When a user of a user device 106 selects an advertisement, the user device 106 generates a request for a landing page of the advertisement. In some implementations, the content item management system 110 includes landing page generator 120 subsystem. Although described as a subsystem, the landing page generator 120 can be a system separate from the content item management system 110, and can be used to generate landing pages for search results as well as advertisements, as will be described in more detail below.

Landing Page Generation for Advertisements

When a user of a user device 106 selects an advertisement, the user device 106 generates a request for a landing page for the advertisement. In some implementations, the request is directed to the landing page generator 120. The landing page generator 120, in response to receiving the request, generates a customized landing page based on unexposed personalization data 124 associated with the request, and provides the landing page to the user device 106. The landing page is, for example, a webpage belonging to the same domain of the advertisement management system 110. As used in this specification, resource "belongs" to a particular domain when it has administrative authority for that domain. For example, the resource addressed by the URL www.example.com/somereource.htm belongs to the domain "example.com."

For example, a user device 106 may request a landing page in response to a click on an advertisement for a "digital camera." In turn, the advertisement management system accesses personalization data 124 associated with the user device 106. The personalization data 124 may include historical data associated with the user device, including previous searches received from the user device 106 and provided from the search engine 112, navigation history, and other information. In some implementations, the personalization data 124 is only accessible by the content item management system 110 when the user consents to sharing the information with the content item management system 110. The personalization data 124 can be, for example, generated from or include the query logs 115 and selection logs 116. Other appropriate personalization data can also be used.

After the content item management system accesses personalization data 124 associated with the user device 106, the landing page generator 120 generates a customized landing page for the digital camera advertisement based on the accessed data. The generated landing page is then hosted by the advertising service, at a domain belonging to the advertising service, and in turn, provided to the user device in response to the request. For example, the landing page generator 120 may generate an advertising service hosted landing page that is customized to present a digital SLR camera based on the accessed personalization data for the request. Accordingly, personalization data is not released to the advertiser, yet customized landing pages that are likely to increase advertisements yield are provided to the user device based the personalization data.

In variations of these implementations, the landing page generator 120 may redirect the request to a host of an advertiser, e.g., a server that belongs to a domain of the advertiser. The server of the advertiser then serves a resource having a parent frame that belongs to the domain of the advertiser, but that includes an iFrame that belongs to the domain of the content item management system 110, and that is a child of the parent frame. Again, personalization data is not released to the advertiser.

The landing page typically includes a link to a resource that belongs to the domain of the advertiser, e.g., a product webpage maintained by the advertiser. The link is selected, for example, by the landing page generator 120 based on the personalization data 124 and the advertisement data 122. The advertisement data 122 may include, for example, advertisements, selection information, and budgeting information for advertisers. The advertisement data 122 may also include data indicating the performance of the advertisements that are served. Such performance data can include, for example, click through rates for advertisements, the number of impressions for advertisements, and the number of conversions for advertisements. Other performance data can also be stored in advertisement data store 122.

Example Data Flow

Figure 2:
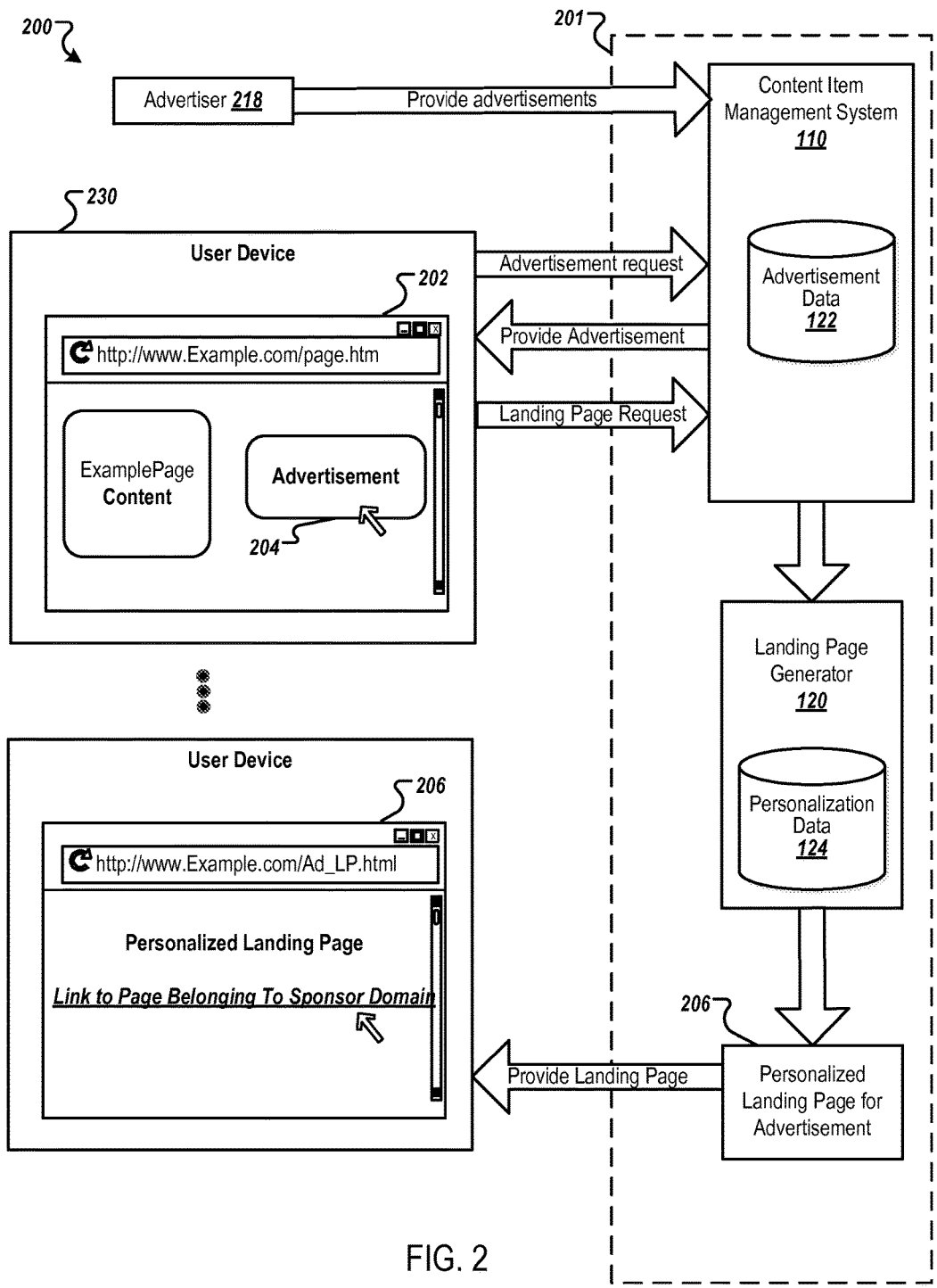
FIG. 2 is a block diagram of an example data flow for generating customized landing pages based on unexposed personalization data.
Figure 3:
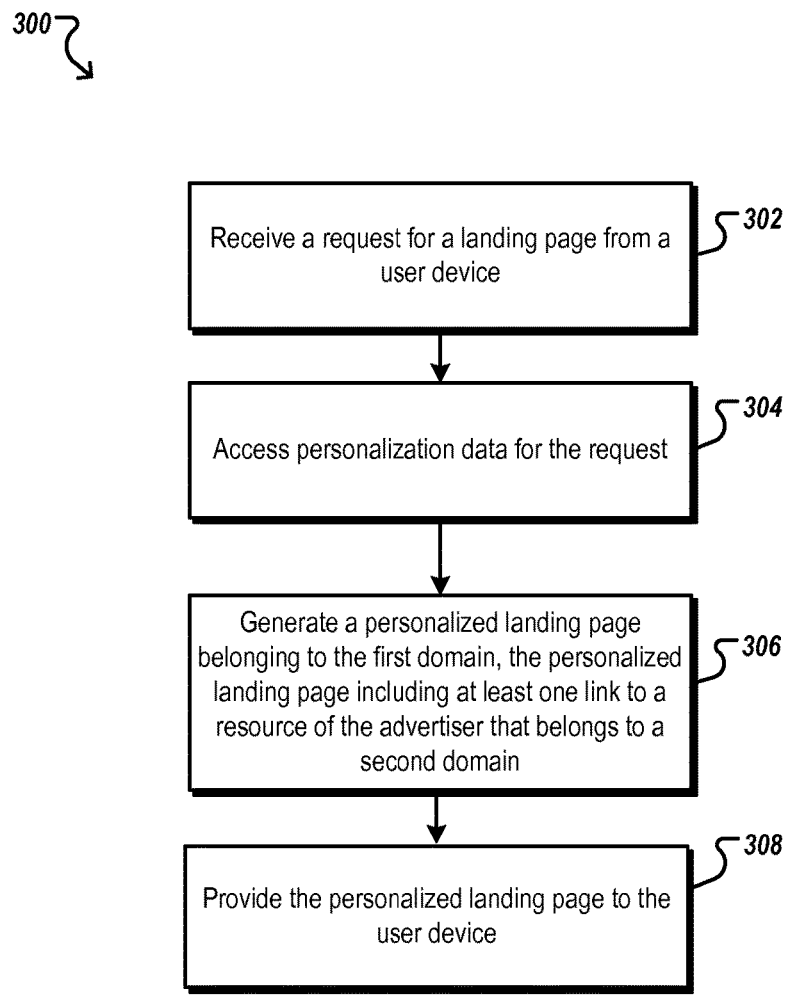
FIG. 3 is a flow diagram of an example process for generating personalized landing pages based on unexposed personalization data.

FIG. 2 is a block diagram of an example data flow 200 that can be used to generate customized landing pages based on unexposed personalization data 124, as described above. The data flow of FIG. 2 is described with reference to FIG. 3, which is a flow diagram of an example process 300 for generating personalized landing pages based on unexposed personalization data.

The phantom box 201 around the content item management system 110 components indicates that the systems responsible for actions such as provisioning of advertisements with resources and the generation of customized landing pages belong to a first domain, e.g., a domain of the content item management system 110.

The example data flow begins with advertisers such as advertiser 218 providing advertisement and account information to the content item management system 110. The advertiser 218 is an advertiser that is associated with a different domain than that of the advertising service described above, e.g., the advertiser maintains a website that belongs to a second domain. The advertiser 218 may provide multiple advertisements, and data related to the advertisements, e.g., selection data, budgeting data, data feeds, and resource addresses of particular pages for particular product and service offerings. These data are stored in advertisement data store 122.

User devices send requests to the content item management system 110 for advertisements, and the content item management system 110 receives the request (302). For example, the user device 230 is depicted as displaying a webpage 202 referenced by the resource address www.example1.com/page.htm, and the webpage 202 includes an advertisement 204 served by the content item management system 110. The webpage 202 may be hosted by the content item management system 110, or by some other publisher. The webpage 202 may be, for example, a search results page with search results content and an advertisement 204 served by the content item management system 110.

When a user interacts with, e.g., selects, the advertisement 204, the user device 230 requests a landing page for the advertisement from the content item management system 110 by sending the request to the content item management system 110. When the content item management system 110 receives a request for a landing page, data for the request may be passed from the content item management system 110 to the landing page generator 120 subsystem. The landing page generator 120 is responsible for generating customized landing pages for advertisements.

The landing page generator 120 access personalization data 124 for the request (304). The personalization data may be information from a user account of the user, e.g., a user account maintained by the content item management system 110. Such user account information may include information specified by the user, and the user's search history. Personalization data 124 may also include other appropriate information.

In another implementation, the personalization information may be session data for a most recent session, and is not otherwise associated with a user identifier. For example, the personalization data may be the last n queries received from the user device during a predefined time period, e.g., one hour, or during some other appropriate session type. As used herein, a "session data" are data collected and determined to be related in response session criteria being met. Session criteria may define a session by any appropriate conditions, including n most recent queries, and/or data received during the most recent m minutes, etc.

The landing page generator 120 generates a personalized landing page 204 for the advertisement based the accessed personalization data (306). For example, assume the personalization data are the last five most recent queries received from the user device 230 by a search engine. Assume the last five queries are "SLR Cameras," "professional grade cameras," "puppies," "dog photography," and "digital cameras," with the query "digital cameras" being the most recent query. The webpage 202 is a search results page for the query "digital cameras," and the advertisement 204 is for a provider of digital cameras.

From the personalization data, the landing page generator 120 determines that a landing page for a particular type of camera, e.g., a digital SLR camera, would be more likely to satisfy a user's informational need than a landing page for other types of cameras. The determination can be made, for example, by use of any appropriate topical analysis algorithm. Therefore, the landing page generator 120 selects data related to one or more digital SLR cameras offered by the advertiser.

The personalized landing page 206 belongs to the domain of the content item management system 110, e.g., example2.com. The personalized landing page 206 also includes a link to a webpage belonging to a domain different than that of the advertising service. For example, the customized webpage may include a link to a webpage belonging to the domain of the advertiser 218. The webpage linked to from the personalized landing page 206 may, for example, facilitate purchase of the item described in the customized landing page, or perhaps describe the advertised products or services in more detail.

The content item management system 110 provides the personalized landing page 206 to the user device (310). Upon receipt, the user device 230 renders the personalized landing page 206 for display.

Landing Page Environments and Content

In some implementations, the advertiser may define a template for the personalized landing page. The template may convey the advertiser's brand, and may include invariable content that is provided with each instance of the personalized landing page. Examples of invariable content include company names, logos, and other information the advertiser desires to be presented with each instance of a landing page.

The template may also define a maximum number of products and services to be displayed in the personalized landing page. For example, a first advertiser may specify that a user be provided with no more than two offerings in a personalized landing page, while a second advertiser may specify that a user be presented with no more than six offerings in a personalized landing page.

In some implementations, the landing page generator 120 can generate the landing page based data specified by the advertiser for use in generating personalized landing pages. The landing page generator 120 may allow an advertiser to specify links for various products. When one of the products is included in the personalized landing page, the corresponding link the advertiser specified for the product is also included in the landing page. The information can be provided in a variety of appropriate ways, e.g., by data feeds to the content item management system 110, or by annotated crawl pages that are generated for crawling by the content item management system 110.

In other implementations, the landing page generator 120 can request specific data for inclusion in a personalized landing page at run time. For example, the landing page generator 120, having determined that the personalized landing page should be for digital SLR cameras, may send a request for digital SLR camera offerings to the advertiser. The advertiser responds with one or more products or offerings that meet the request, and the landing page generator 120 incorporates the responsive data into the personalized landing page.

As described with reference to FIG. 2, the landing page is hosted by the content item management system 110, which belongs to the domain example.com. In some implementations, the personalized landing page may be provided for rendering in an iFrame in a webpage that belongs to the domain of the advertiser. The iFrame may be generated in a parent iFrame that belongs to the domain of the advertiser, but the iFrame itself belongs to the domain of the content item management system 110. For example, the parent iFrame may belong to a domain of digital camera online store, and the child iFrame may belong to the content item management system 110. Accordingly, the user device 230 will render the digital camera online store webpage in the parent iFrame, and will render the personalized landing page rendered in the child iFrame. In this way the user's personalization data is not exposed to the advertiser, but the "look and feel" and brand of the advertiser conveyed in the parent iFrame environment that belongs to the domain of the advertiser.

Personalization of Addition Types of Landing Pages

In the examples above, personalization is described in the context of an advertising landing page. However, the landing page generator 120 can also be implemented within or in connection with the search engine 112 to generate a personalized result page for a search result or search operation. For example, a person may search for a Pizza restaurant using the search engine 112, and enter several queries, such as "pizza," "pizza reviews," "thin crust pizza," and "Italian restaurants." One of the search results for "Italian restaurants" may reference a review website that aggregates user reviews. However, when the user selects the search result, the resource that is served is a page hosted by the review website for a particular restaurant that serves a variety of Italian foods, one of which is pizza. The user will thus need to navigate the reviews, or do a subsequent search on the review website, to find user reviews for pizza.

Figure 4:
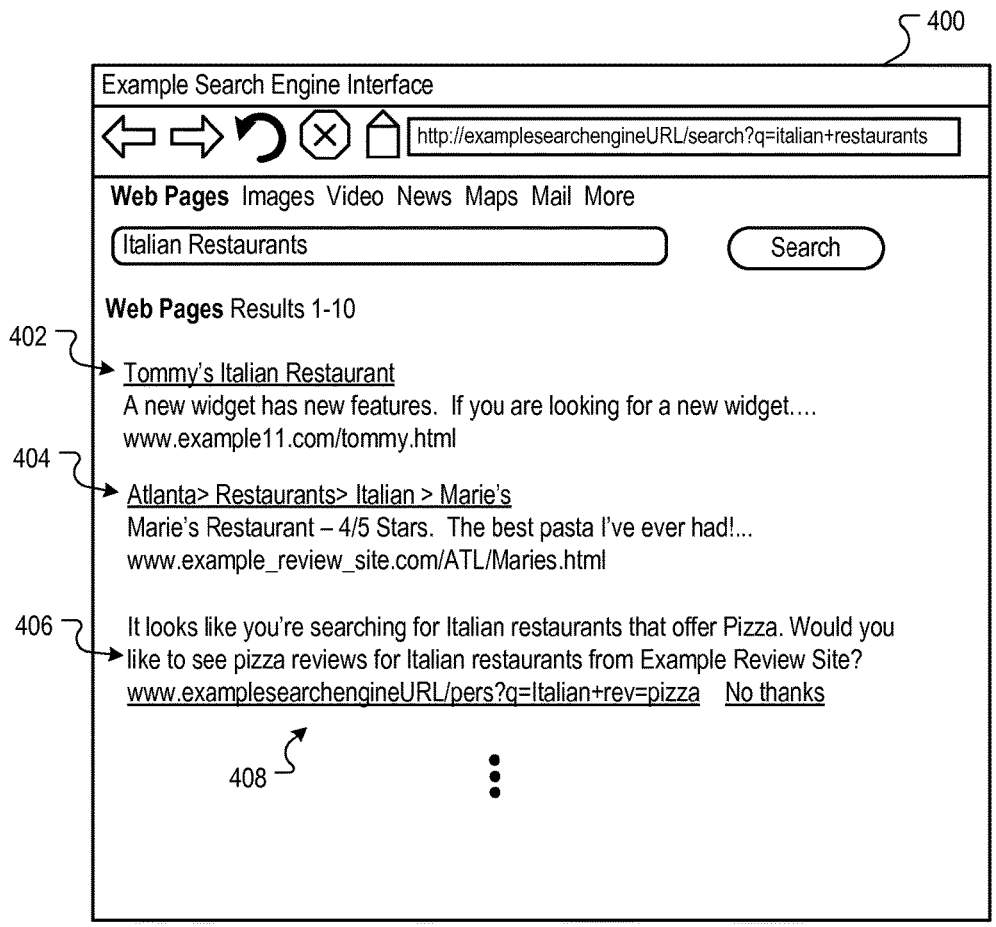
FIG. 4 depicts a portion of an example search results page.

The landing page generator 120, however, may provide an alternate search result that takes into account personalization data available for the user. For example, FIG. 4 depicts a portion of an example search results page 400 that includes search results 402 and 404 for the search query "Italian Restaurants." The search result 404 references a review website that aggregates user reviews. Because the search engine 112 that provided the search results page 400 has access to the user's previous searches of "pizza," "pizza reviews," "thin crust pizza," the search engine 112 determines that the user has an interest in the topic of pizza. Furthermore, the search engine 112 also has data describing the review site, e.g., from crawling the review site, or by receiving an annotated feed from the review site. The search result 404 references a resource that is responsive to the query "Italian restaurants." However, the search engine 112, based on the identified topic of "pizza," determines that particular reviews from the website directed to the subject of pizza for the particular restaurant would be more likely to satisfy the user's informational need than reviews for other types of Italian foods served by the restaurant. In response, the search engine generates a personalized resource that includes, for example, only the reviews for pizza for the restaurant from the review website. The personalized resource is referenced by the search result 406, and is addressed by the URL 408.

Thus, the user may access the pizza reviews by selecting the search result 406 without having to first navigate to the review site and then search the restaurant reviews for pizza. Furthermore, the user's search history is not exposed to the review site, as the search engine 112 hosts the personalized resource.

Additional Implementation Details

The example above discusses the generation of a personalized landing page 206, with respect to advertisements based on personalization data such as submitted search queries. However, other personalization options can be implemented and other personalization data may be utilized. The personalized landing page may be personalized based on user specified preferences such as color schemes, fonts, and graphical content size. For example, a user with a slow internet connection may decide to set and share a user preference specifying that the user prefers less graphically intensive pages. Such personalization data may be used to generate a landing page that includes a small amount of graphical content. Other examples will be described in detail in the next section.

Figure 5:
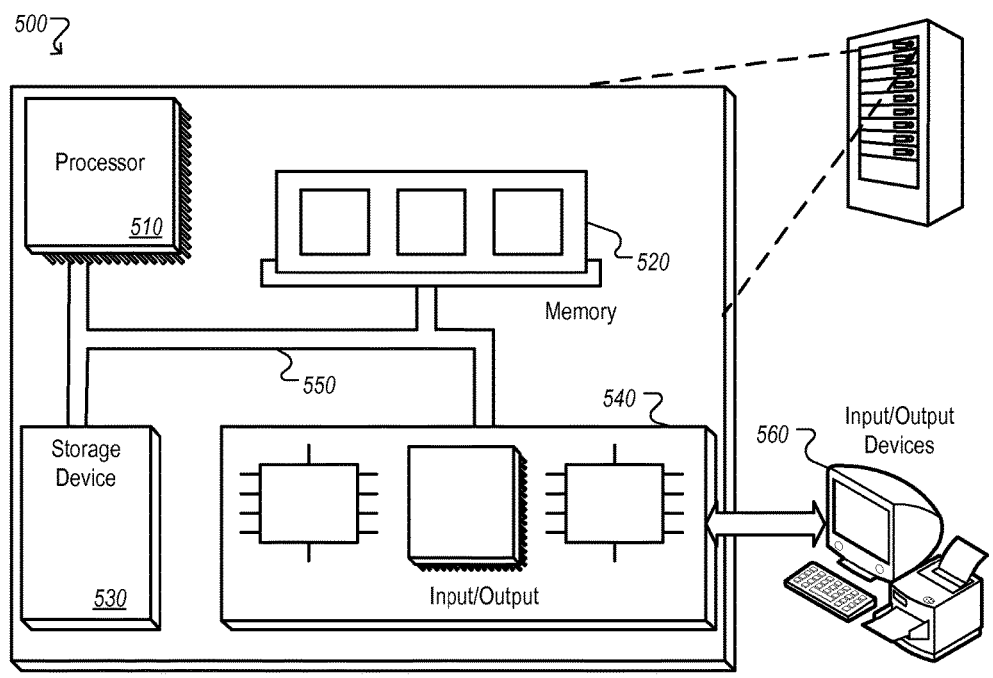
FIG. 5 is block diagram of an example computer system.

FIG. 5 is block diagram of an example computer system 500 that can be used to customize landing pages. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, or some other large capacity storage device.

The input/output device 540 provides input/output operations for the system 500. In one implementation, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by one or more servers that are part of a first domain, the first domain being a domain of a service, the method comprising:
   receiving, from a user device, a request for a landing page that was generated in response to a selection of a content item displayed in a search results page for a given search query;
   determining, by the one or more servers, that a provider of the content item has one or more online resources belonging to a second domain that differs from the first domain;
   accessing, by the one or more servers, session data including search queries that were previously submitted to a search engine during a session, wherein the service maintains the session data within the first domain without transmitting the session data to the second domain of the provider;
   identifying, by the one or more servers, items included in the one or more resources of the second domain using the given search query and at least one of the previously submitted search queries that is different from the given search query;
   generating, by the one or more servers and responsive to the request, a personalized landing page that is not part of the second domain of the provider, but includes the identified items from the second domain, wherein:
      the landing page is hosted in the first domain of the service; and
      the landing page includes at least one link to a resource that is hosted in the second domain; and
   providing, by the one or more servers and to the user device over a communications network, computer executable instructions that initiate presentation of the generated personalized landing page on a display of the user device.

2. The method of claim 1, wherein the content item is an advertisement.

3. The method of claim 1, wherein generating, by the one or more servers and for the request, the personalized landing page comprises:
   accessing offer data describing offerings provided by the provider; and
   selecting, based on the offer data, one or more offerings to include in the personalized landing page.

4. The method of claim 1, wherein:
   the request for the landing page includes an identifier; and
   accessing, by the one or more servers, session data comprises accessing session data associated with the identifier.

5. The method of claim 1, wherein the identifier is a user device identifier that uniquely identifies the user device.

6. The method of claim 1, wherein providing, by the one or more servers, the personalized landing page to the user device comprises:
   providing the personalized landing page for rendering in an iFrame that belongs to the first domain, and wherein the iFrame is generated in a parent frame that belongs to the second domain.

7. A system, comprising:
   one or more data processing apparatus that are part of a first domain, the first domain being a domain of a service; and
   one or more memory storage apparatus storing instructions executable by the one or more data processing apparatus and that upon such execution cause the one or more data processing apparatus to perform operations comprising:
      receiving, from a user device, a request for a landing page that was generated in response to a selection of a content item displayed in a search results page for a given search query;
      determining that a provider of the content item has one or more online resources belonging to a second domain that differs from the first domain;
      accessing session data including search queries that were previously submitted to a search engine during a session, wherein the service maintains the session data within the first domain without transmitting the session data to the second domain of the provider;
      identifying items included in the one or more resources of the second domain using the given search query and at least one of the previously submitted search queries that is different from the given search query;

generating, in response to the request, a personalized landing page that is not part of the second domain of the provider, but includes the identified items from the second domain, wherein:
    the landing page is hosted in the first domain of the service; and
    the landing page includes at least one link to a resource that is hosted in the second domain; and providing to the user device over a communications network, computer executable instructions that initiate presentation of the generated personalized landing page on a display of the user device.

8. The system of claim 7, wherein the content item is an advertisement.

9. The system of claim 7, wherein generating, in response to the request, the personalized landing page comprises:
    accessing offer data describing offerings provided by the provider; and
    selecting, based on the offer data and the personalization data, one or more offerings to include in the personalized landing page.

10. The system of claim 7, wherein:
    the request for the landing page includes an identifier; and
    accessing session data comprises accessing session data associated with the identifier.

11. The system of claim 7, wherein the identifier is a user device identifier that uniquely identifies the user device.

12. The system of claim 7, wherein providing the personalized landing page to the user device comprises:
    providing the personalized landing page for rendering in an iFrame that belongs to the first domain, and wherein the iFrame is generated in a parent frame that belongs to the second domain.

13. A non-transitory memory storage apparatus storing instructions executable by one or more data processing apparatus that are part of a first domain of a service and that upon such execution cause the one or more data processing apparatus to perform operations comprising:
    receiving, from a user device, a request for a landing page that was generated in response to a selection of a content item displayed in a search results page for a given search query;
    determining that a provider of the content item has one or more online resources belonging to a second domain that differs from the first domain;
    accessing session data including search queries that were previously submitted to a search engine during a session, wherein the service maintains the session data within the first domain without transmitting the session data to the second domain of the provider;
    identifying items included in the one or more resources of the second domain using the given search query and at least one of the previously submitted search queries that is different from the given search query;
    generating, in response to the request, a personalized landing page that is not part of the second domain of the provider, but includes the identified items from the second domain, wherein:
        the landing page is hosted in the first domain of the service; and
        the landing page includes at least one link to a resource that is hosted in the second domain; and
    providing, to the user device over a communications network, computer executable instructions that initiate presentation of the generated personalized landing page on a display of the user device.

14. The non-transitory memory storage apparatus of claim 13, wherein the content item is an advertisement.

15. The non-transitory memory storage apparatus of claim 13, wherein generating, in response to the request, the personalized landing page comprises:
    accessing offer data describing offerings provided by the provider; and
    selecting, based on the offer data, one or more offerings to include in the personalized landing page.

16. The non-transitory memory storage apparatus of claim 13, wherein:
    the request for the landing page includes an identifier; and
    accessing, by the one or more servers, session data comprises accessing session data associated with the identifier.

17. The non-transitory memory storage apparatus of claim 13, wherein the identifier is a user device identifier that uniquely identifies the user device.

18. The non-transitory memory storage apparatus of claim 13, wherein providing, by the one or more servers, the personalized landing page to the user device comprises:
    providing the personalized landing page for rendering in an iFrame that belongs to the first domain, and wherein the iFrame is generated in a parent frame that belongs to the second domain.

* * * * *